United States Patent
Knezevic et al.

(10) Patent No.: US 10,824,718 B2
(45) Date of Patent: Nov. 3, 2020

(54) SHUFFLING MECHANISM FOR SHUFFLING AN ORDER OF DATA BLOCKS IN A DATA PROCESSING SYSTEM

(71) Applicant: NXP B.V., Eindhoven (NL)

(72) Inventors: Miroslav Knezevic, Herent (BE); Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 274 days.

(21) Appl. No.: 16/027,521

(22) Filed: Jul. 5, 2018

(65) Prior Publication Data

US 2020/0012782 A1 Jan. 9, 2020

(51) Int. Cl.
*G06F 21/00* (2013.01)
*G06F 21/54* (2013.01)
*G06F 7/58* (2006.01)

(52) U.S. Cl.
CPC ............. *G06F 21/54* (2013.01); *G06F 7/588* (2013.01)

(58) Field of Classification Search
None
See application file for complete search history.

(56) References Cited

U.S. PATENT DOCUMENTS

| 6,327,661 | B1 | 12/2001 | Kocher et al. | |
|---|---|---|---|---|
| 7,142,670 | B2 * | 11/2006 | Chari | G06F 21/556 380/28 |
| 7,318,145 | B1 * | 1/2008 | Stribaek | G06F 9/30072 712/219 |
| 7,868,788 | B2 * | 1/2011 | Au | H03M 7/3088 341/51 |
| 8,666,068 | B2 * | 3/2014 | Sharon | G11B 20/0021 380/28 |
| 10,491,372 | B2 * | 11/2019 | Wurcker | G09C 1/00 |
| 2006/0245587 | A1 * | 11/2006 | Pinkas | H04L 9/085 380/28 |
| 2008/0019503 | A1 * | 1/2008 | Dupaquis | H04L 9/003 380/28 |

(Continued)

FOREIGN PATENT DOCUMENTS

EP 3379765 A1 9/2018

OTHER PUBLICATIONS

Herbst, Christoph, et al.; "An AES Smart Card Implementation Resistant to Power Analysis Attacks;" ACNS'06 Proceedings of the 4th International Conference on Applied Cryptography and Network Security, Jun. 6-9, 2006, Singapore.

(Continued)

*Primary Examiner* — Maung T Lwin
(74) *Attorney, Agent, or Firm* — Daniel D. Hill

(57) ABSTRACT

A method is provided for shuffling an order of a plurality of data blocks. In the method, a random number is generated, the random number corresponding to an index for a data block of the plurality of data blocks, where each data block of the plurality of data blocks has an index that uniquely identifies each data block of the plurality of data blocks. The increment function with a parameter is applied to the random number to generate a new index, the new index corresponds to a data block of the plurality of data blocks. The data block corresponding to the new index is selected as the next data block of a reordering of the plurality of data blocks. The method is iterated until the reordering of the plurality of data blocks is complete.

19 Claims, 6 Drawing Sheets

(56) References Cited

U.S. PATENT DOCUMENTS

2010/0067687 A1* 3/2010 Chandramouli ...... H04L 9/0618
　　　　　　　　　　　　　　　　　　　　　　　380/37
2013/0101111 A1　4/2013 Sharon et al.
2019/0042241 A1* 2/2019 Akin ................... G06F 9/3013

OTHER PUBLICATIONS

Medeiros, Stephane Fernandes, et al.; "The Schedulability of AES as a Countermeasure Against Side Channel Attacks;" SPACE'12 Proceedings of the Second international conference on Security, Privacy, and Applied Cryptography Engineering, ; Publication Date Nov. 3, 2012; Chennai, India.

Tillich, Stefan, et al.; "Protecting AES Software Implementations on 32-Bit Processors Against Power Analysis;" ACNS '07 Proceedings of the 5th International Conference on Applied Cryptography and Network Security, Jun. 5-8, 2007, Zhuhai, China.

Veshchikov, Nikita, et al.; "Variety of Scalable Shuffling Countermeasures Against Side Channel Attacks" Journal of Cybersecurity and Mobility, 2017, Retrieved from the Internet: https://www.riverpublishers.com/journal_read_html_article.php?j=JCSM/5/3/2.

Veyrat-Charvillon, Nicolas, et al.; Shuffling Against Side-Channel Attacks : A Comprehensive Study with Cautionary Note; ASIACRYPT'12 Proceedings of the 18th International Conference on the Theory and Application of Cryptology and Information Security, Dec. 2, 2012, Beijing, China.

Young, Dr. Adam L., et al.; "Malicious Cryptography Exposing Cryptovirology" Published Feb. 2004 Wiley Publishing, Inc., Indianapolis, Indiana; ISBN: 978-0-764-54975-5.

* cited by examiner

SHUFFLING MECHANISM FOR SHUFFLING AN ORDER OF DATA BLOCKS IN A DATA PROCESSING SYSTEM

BACKGROUND

Field

This disclosure relates generally to data processing, and more particularly, to a shuffling mechanism for shuffling an order of data blocks in a data processing system.

Related Art

In secure data processing systems, attackers may use side-channel attacks to extract secret information. Side-channel attacks extract the secret information using physical properties of the systems. For example, an attacker may monitor properties such as execution time and energy consumption of a target device to learn useful information that can expose stored secrets.

There are many different countermeasures for mitigating side-channel attacks. One common countermeasure is called shuffling. Shuffling reorders independent operations in a random order. Shuffling countermeasures spread the information leakage across the time domain. Shuffling works better as a countermeasure when there are a lot of independent operations to rearrange, and if the independent operations are rearranged using many time slots at which a specific operation can potentially be executed. Also, the system is more secure when there are more different orders of execution for all rearranged operations.

There are several different shuffling techniques. One well-known shuffling technique is called random permutation (RP). Random permutation uses a layer of indirection and can produce all possible n! permutations of independent operations applied on a state of size n. While RP provides all possible permutations, RP requires an additional data structure and more time, as compared to some other shuffling schemes. The additional data structure is the same size as the number of operations that are shuffled. Other shuffling techniques include: random starting index (RSI), reverse shuffle (RS), and sweep swap shuffle (SSS). There are advantages and disadvantages to the various shuffling techniques. For example, the RSI and RS schemes are faster than RP. Also, RP requires a significant amount of resources to implement in a hardware implementation. Also, RP has the disadvantage of requiring a permutation to be generated in advance. In addition, some known RP implementations do not result in uniformly distributed permutations. The RSI and RS schemes do not have the above-mentioned disadvantages of the RP scheme, but have a disadvantage of not generating as many permutations as the RP scheme.

Therefore, a need exists for a shuffling mechanism or scheme that can generate more permutations and does not require any large precomputations or additional large data structures.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
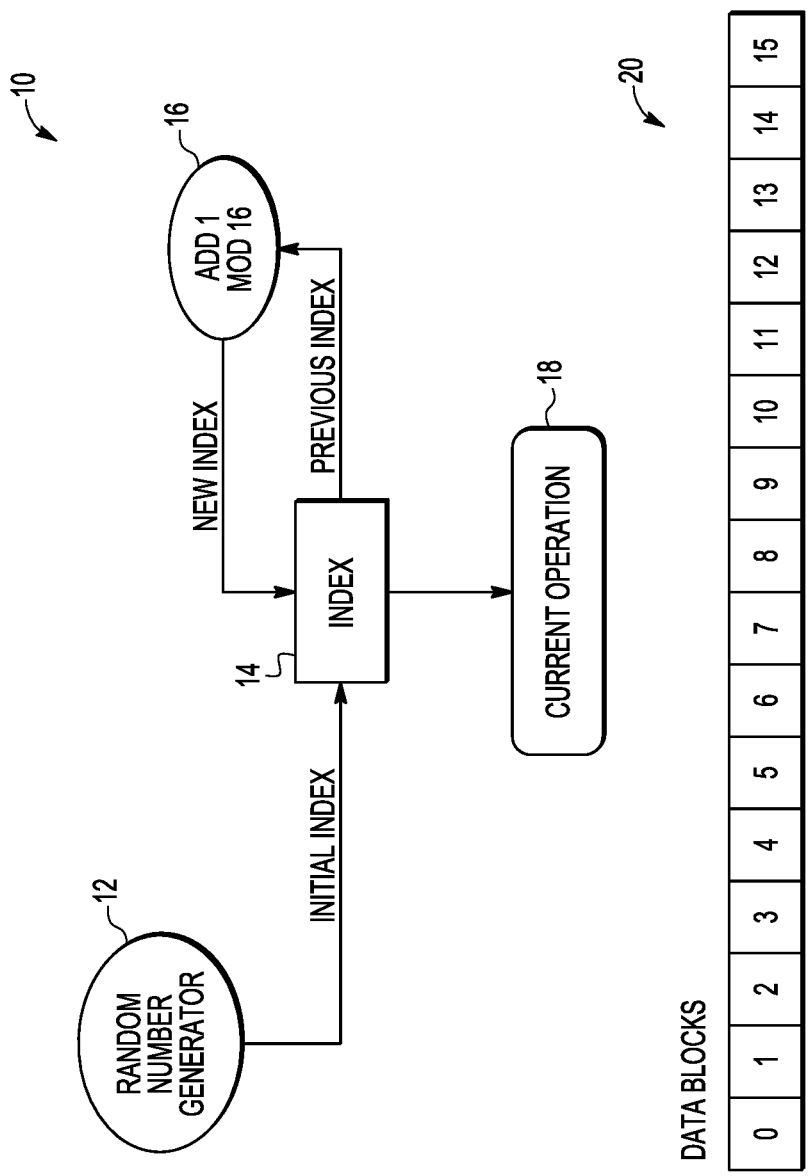
FIG. 1 illustrates a prior art RSI shuffling mechanism.

Generally, there is provided, a shuffling mechanism for shuffling an order of a plurality of data blocks in a data processing system. The data blocks may include, for example, independent operations to be executed in a data processing system. The independent operations are independent because their execution order can be changed without affecting the functionality of the application. The method generates a first random number as a starting index, and a second random number provides a parameter for use by an increment function. The increment function is then applied to the index to determine a next index in a reordering of the data blocks. The increment function may be, for example, an addition, multiplication, or exponential function that is performed on the previously generated index to provide the next index.

The disclosed shuffling mechanisms generate more permutations of the shuffling order than either RSI or RS. Also, the shuffling mechanisms do not require a large additional data structures to contain the permutations. As compared to RP, the disclosed embodiments only use a small fixed amount of memory to store the parameter. In addition, no precomputations are required. Further, the method improves the ability to shuffle different operations. The method can be instantiated with only a few resources in software as well as hardware.

In accordance with an embodiment, there is provided, a method for shuffling an order of a plurality of data blocks, the method including: providing a parameter for use with an increment function; generating a random number, the random number corresponding to an index for a data block of the plurality of data blocks, wherein each data block of the plurality of data blocks has an index that uniquely identifies each data block of the plurality of data blocks; applying the increment function with the parameter to the random number to generate a new index, the new index corresponding to a data block of the plurality of data blocks; selecting the data block corresponding to the new index as the next data block of a reordering of the plurality of data blocks; and iterating the method until the reordering of the plurality of data blocks is complete. The increment function may include one or more of either an addition function, a multiplication function, or an exponential function. The indexes of the plurality of data blocks may be a sequence of indexes. The new index may be a starting index for a row of a plurality of rows, and the method may be repeated to determine an order of operations for each row of the plurality of rows. The plurality of data blocks may be organized as a plurality of rows of data blocks, each of the plurality of rows having a plurality of entries, wherein the method is used to select a row of the plurality of rows, and wherein the method is used for each of the plurality of rows. The method may further include randomly selecting the increment function from a plurality of increment functions. Iterating the method may further include iterating the method by a modulo of a prime number. The plurality of data blocks may include a plurality of operations to be executed in a data processing system.

In another embodiment, there is provided, a method for shuffling an order of a plurality of operations to be executed in a data processing system, the method including: providing a parameter for use with an increment function; generating a random number, the random number corresponding to an index for an operation of the plurality of operations, wherein each operation of the plurality of operations has an index that uniquely identifies each operation of the plurality of operations; applying the increment function with the parameter to the random number to generate a new index, the new index corresponding to an operation of the plurality of operations; selecting the operation corresponding to the new index as the next operation in a reordering of the plurality of operations; and iterating the method until the reordering of the plurality of operations is complete. The increment function may include one more of either an addition function, a multiplication function, or an exponential function. The new index may be a starting index for a row of a plurality of rows, and wherein the method may be repeated to determine an order of operations for each row of the plurality of rows. The method may be repeated to determine an order of operations for each row of the plurality of rows using a different increment function. The plurality of operations may be organized as a plurality of rows of operations, each of the plurality of rows having a plurality of entries, wherein the method is used to select a row of the plurality of rows, and wherein the method is used for each of the plurality of rows. The method may further include randomly selecting the increment function from a plurality of increment functions. Iterating the method may further include iterating the method by a modulo of a prime number. The plurality of data blocks may include a plurality of operations to be executed in a data processing system.

In yet another embodiment, there is provided, a shuffling mechanism, including: a random number generator for generating a random number for use as an index for a data block of the plurality of data blocks, wherein each data block of the plurality of data blocks has an index that uniquely identifies each data block of the plurality of data blocks; an increment function block for receiving a parameter and the index, and in response, generating a new index by applying an increment function with the parameter to the index, the new index corresponding to a data block of the plurality of data blocks; a storage element for storing the plurality of data blocks; and a processor for selecting the data block corresponding to the new index as the next data block of a reordering of the plurality of data blocks. The increment function may include one or more of either an addition function, a multiplication function, or an exponential function. The plurality of data blocks may include a plurality of operations to be executed in the processor. The increment function may be selected randomly from a plurality of increment functions.

FIG. 1 illustrates a prior art RSI shuffling mechanism 10. Shuffling mechanism 10 includes random number generator (RNG) 12, index storage 14, increment function 16, and current operation storage 18. Random number generator 12 provides a random number that is used as an initial index to index storage 14. The initial index may be an address or other reference used to identify an instruction, operation, data block, or other data structure having a plurality of entries. In one embodiment, shuffling mechanism 10 is used to shuffle the order of independent operations of an application, as for example, the 16 operations shown as operations 20 in FIG. 1. Independent operations are operations that may not have to be executed in any particular order. Generally, using shuffling mechanism 10 to shuffle operations will result in only the starting operation being random. In an operation to reorder, or shuffle, the plurality of independent operations 20 ordered from 0-15, random number generator 12 is used to generate an initial index labeled "INITIAL INDEX" in FIG. 1 which is stored in index storage 14. The INITIAL INDEX is then provided to increment function 16 as a previous index PREVIOUS INDEX. The INITIAL INDEX is incremented by increment function 16 by adding 1 to the PREVIOUS INDEX. The new index replaces the index stored in index storage 14. If the INITIAL INDEX is the number "3", shuffling mechanism 10 will provide the plurality of operations in the order 3, 4, 5, 6, 7, 8, 9, 10, 11, 12, 13, 14, 15, 0, 1, 2. In an attack of a data processing system having shuffling mechanism 10, the starting operation can be learned by an attacker, the subsequent operations will then be known to the attacker because the subsequent operations will be executed in the same order. The shuffling mechanism RS differs from RSI in that RS only changes the direction operations are executed instead of changing the starting index.

Figure 2:
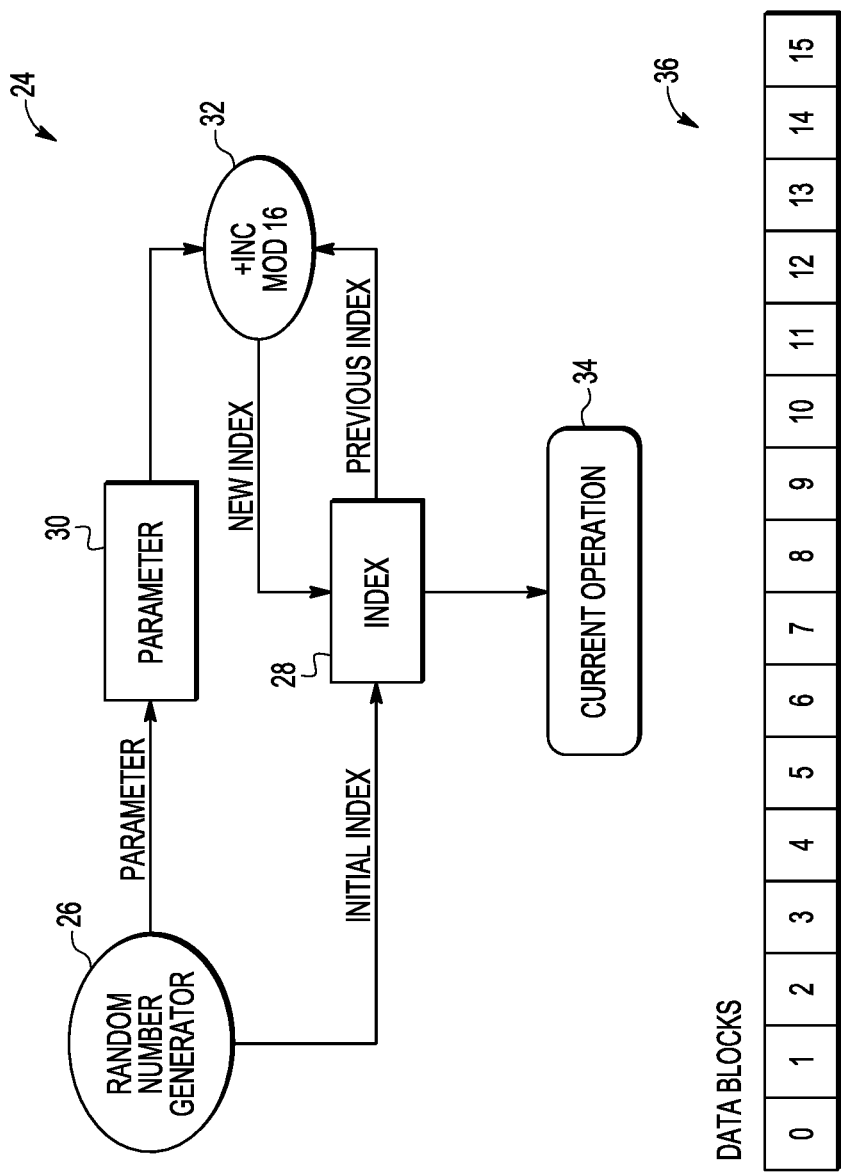
FIGS. 2-5 illustrate various shuffling mechanism embodiments.

FIG. 2 illustrates shuffling mechanism 24 for changing the order of a plurality of operations in accordance with an embodiment. Shuffling mechanism 24 includes RNG 26, index storage 28, parameter storage 30, increment function block 32, and current operation storage 34. Index storage 28, parameter storage 30, and current operation storage 34 may be implemented as one or memories or register files. A plurality of data blocks 36 are also illustrated in FIG. 2. The plurality of data blocks 36 are sequentially numbered with an index that uniquely identifies each data block. A method will be described for shuffling the order of the plurality of data blocks 36. In one embodiment, the plurality of data blocks may be independent operations to be executed in a data processing system, such as data processing system 110 in FIG. 6. In another embodiment, the method may be used to shuffle the order of a plurality of entries of any type of data blocks such as operations, instructions or other data structures. The shuffling method shuffles an order of the plurality of data blocks 36 to reorder the plurality of operations. Current operation storage 34 may be used to store, for example, a current instruction, an index of a data element to be handled next, or an operation to be executed next. An example of a method for shuffling a plurality of independent operations of an application in a data processing system is provided as example for using shuffling mechanism 24. To begin shuffling with shuffling mechanism 24, RNG 26 provides two random numbers, an initial index labeled "INITIAL INDEX" and a parameter labeled "PARAMETER." Random number generator 26 may be implemented as one or more random number generators or pseudo random number generators. The parameter is provided to a first input of increment function block 32. The INITIAL INDEX is provided to a second input of increment function block 32. Increment function block 32 performs an addition function on the currently stored index using the parameter. In another embodiment, the increment function can be another parameterized increment function instead of the addition function. For example, the increment function may be a multiplication function or an exponential function. In other embodiments, the increment function can be a combination of functions. Also, the increment function may require more than one parameter. For example, the increment function can be NEW INDEX=((PREVIOUS INDEX*PARAMETER 1)(mod A)+PARAMETER 2)(mod B), were A and B are fixed depending on the size of the data structure to be shuffled. To begin reordering a plurality of data blocks, increment function block 32 is first loaded with the parameter. Increment function block 32 performs an addition function on the index labeled "PREVIOUS INDEX" received from index storage 28 using the parameter to produce a new index labeled "NEW INDEX." The new index "NEW INDEX" is provided to index storage 28 to replace the previously stored index, and may also be provided to current operation storage 34 to indicate a current operation for the processor to execute if the data block included, for example, an operation. Note that in one embodiment, the storage used to implement index storage 28 may be reused to provide current operation storage 34. The increment function provided by increment function block 32 is iterated with the previous index to provide a new index until all the plurality of independent operations have been shuffled, or reordered in a new order.

As an example, assume RNG 26 generates a random initial index to be 6 and the parameter is 11, then the order of indexes that is generated by increment function block 32 will be 6, 1, 12, 7, 2, 13, 8, 3, 14, 9, 4, 15, 10, 5, 0, and 11 for an addition with modulo 16 increment function. As a second example, if the initial index is 7, and the increment parameter is equal to 3, the shuffling order will be 7, 10, 13, 0, 3, 6, 9, 12, 15, 2, 5, 8, 11, 14, 1, and 4. There are $2^7$=128 different shuffling permutations possible using the shuffling mechanism of FIG. 2 to reorder 16 operations. The number of operations may be different in other examples. Note that shuffling mechanism 24 may be implemented in a data processing system in hardware, software, or a combination of hardware and software. Also, in one embodiment, the reordered data blocks may be stored together in a memory.

Figure 3:
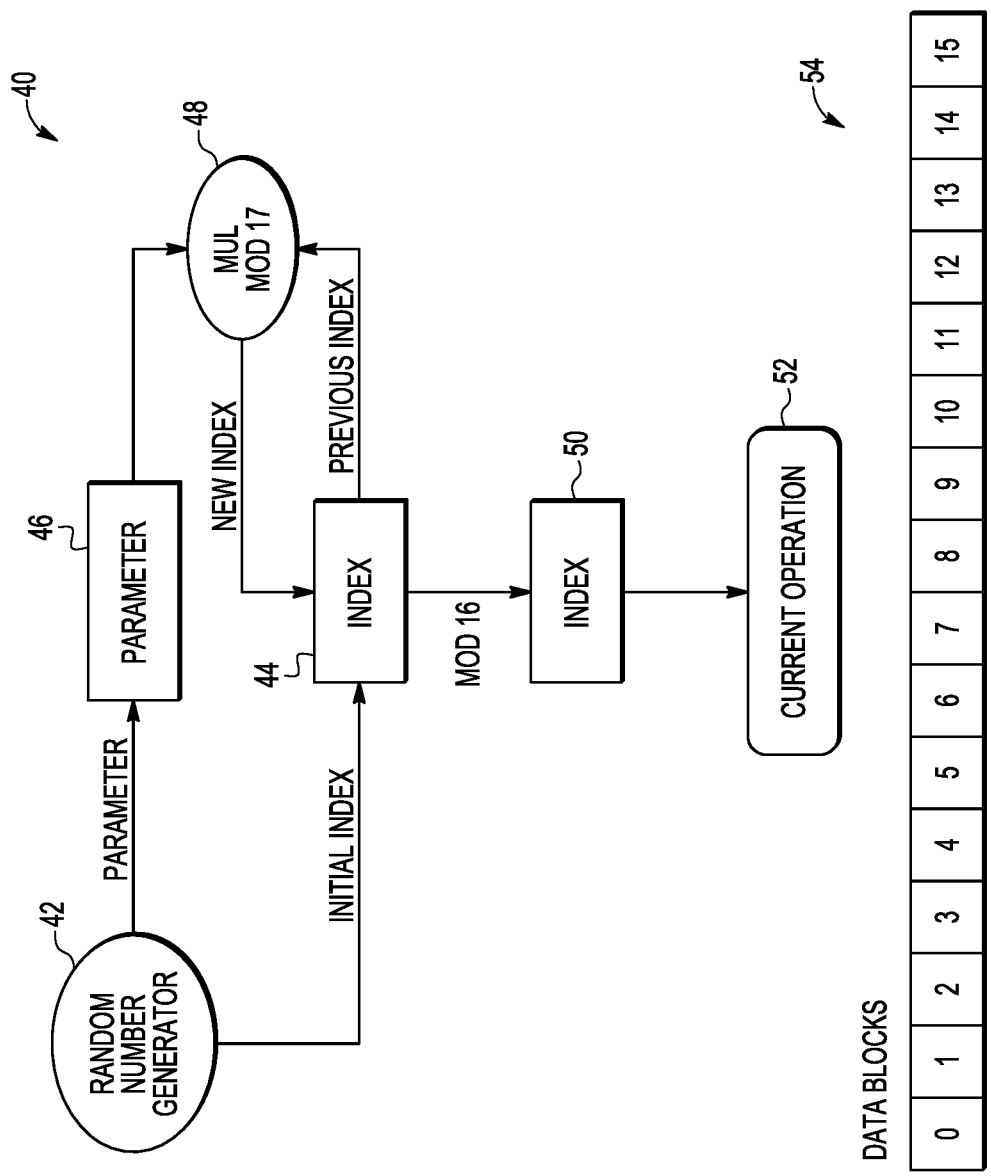

FIG. 3 illustrates shuffling mechanism 40 in accordance with an embodiment. Shuffling mechanism 40 includes RNG 42, first index storage 44, parameter storage 46, increment function 48 second index storage 50, and current operation storage 52. Note that in one embodiment, the storage used to implement second index storage 50 may be reused to provide current operation storage 52. An example of a method for shuffling a predetermined number of independent operations of an application in a data processing system is provided with respect to shuffling mechanism 40. Shuffling mechanism 40 differs partially from shuffling mechanism 24 in that shuffling mechanism 40 uses a multiplication increment function while shuffling mechanism 24 uses an addition increment function. To begin a shuffling operation with shuffling mechanism 24, RNG 42 provides two random numbers, an initial index labeled "INITIAL INDEX" and a parameter labeled "PARAMETER." The initial index is provided to first index storage 44. The parameter is provided to parameter storage 46. Increment function 48 performs a multiplication function on the index value stored in first index storage 44 using the parameter from parameter storage 46. The increment function 48 can be other parameterized functions besides the multiplication function. To begin performing a shuffling operation, increment function 48 is set with the parameter. Increment function 48 performs a multiplication function on the index received from first index storage 44 using the parameter to produce a new index "NEW INDEX." The data blocks are illustrated in FIG. 3 as plurality of data blocks 54. In the illustrated example where the number of data blocks to be reordered equals 16, the multiplication function may be defined using modulo 17 (a prime number). Using mod 17 in the illustrated example where the number of operations equals 16 provides a simple solution to the problem of using every index of the 16 operations without repeating any of the operations. A zero cannot be used in the mathematics for this to be true, therefore, the indexes are renumbered to be 1-16 before the increment function. The new index "NEW INDEX" is provided to index storage 44 replacing the previously storage index "PREVIOUS INDEX". The new index is also provided to second index storage 50 and to current operation storage 52 to indicate the current operation to execute. A conversion to modulo 16 (mod 16) may be provided to return the index numbering to 0-15 after the shuffling operation, and the renumbered index is provided to second index storage 50. The increment function 48 is iterated with the previous index to provide a new index until all the predetermined number of independent operations have been shuffled, or reordered in a new permutation order. In one embodiment, shuffling mechanism 40 reorders 16 independent operations of an application that can be executed in any order. In another embodiment, the number of operations may be any number.

In a more specific example of the operation of shuffling mechanism 40, if RNG 26 generates a random initial index equal to 8 and a parameter equal to 6, then the order of indexes that is generated by increment function 48 will be 8, 14, 0, 11, 15, 5, 13, 10, 9, 3, 1, 6, 2, 12, 4, and 7. There are $2^7$=128 different shuffling permutations possible using the shuffling mechanism of FIG. 3. Note that because a multiplication increment function is used, these shuffling order permutations are different from the 128 different shuffling order permutations of the example of FIG. 2.

Figure 4:
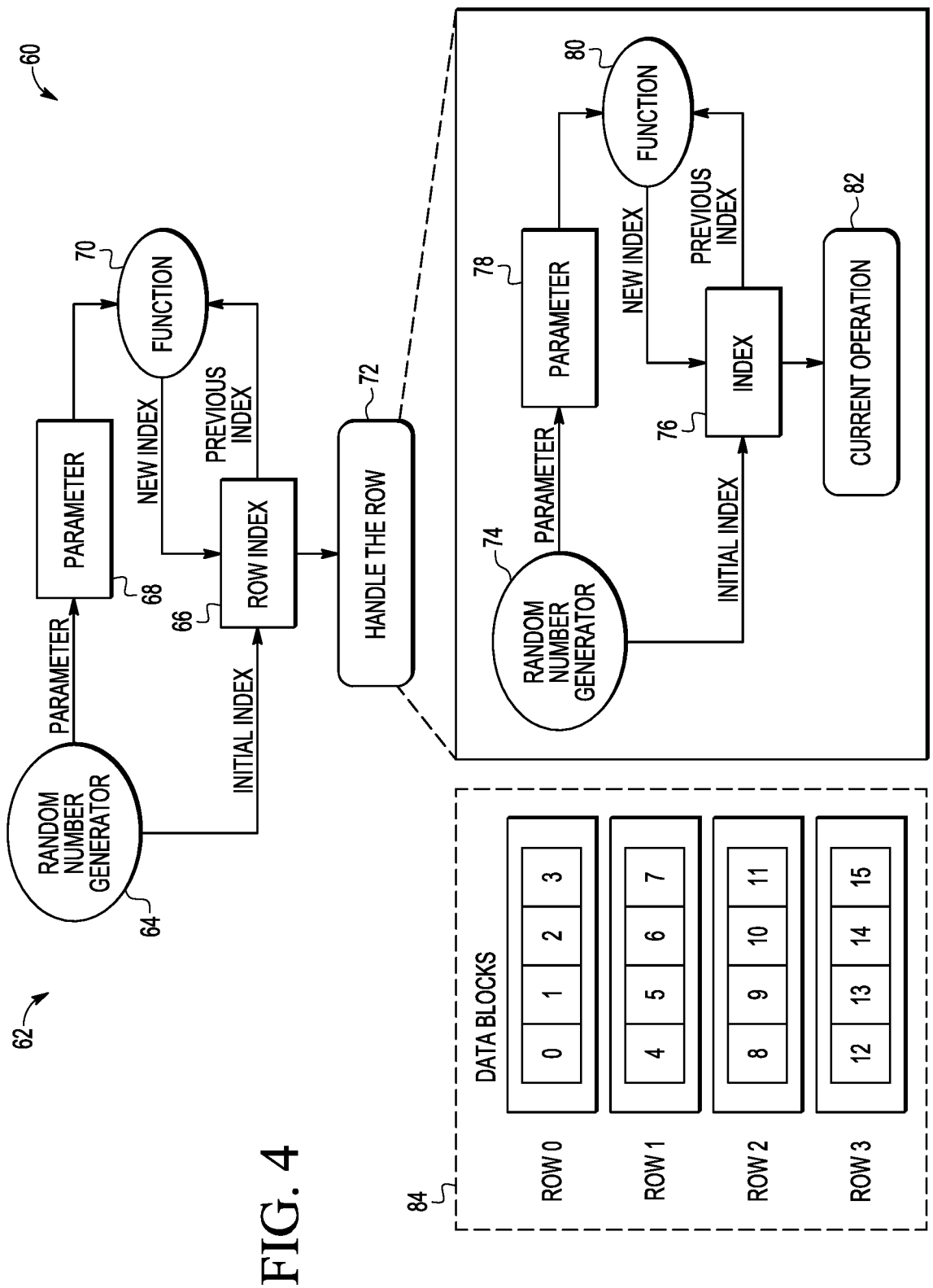

FIG. 4 illustrates a shuffling mechanism 60 in accordance with another embodiment. Shuffling mechanism 60 includes a first shuffling mechanism 62, a second shuffling mechanism 72, and multi-level data structure 84. First and second shuffling mechanisms 62 and 72 may each be comprised of either of the embodiments of FIG. 2 or FIG. 3. As illustrated in FIG. 4, first shuffling mechanism 62 includes RNG 64, row index storage 66, parameter storage 68, and increment function 70. An output of row index storage 66 is coupled to shuffling mechanism 62. Shuffling mechanism 72 includes RNG 74, index storage 76, parameter storage 78, increment function 80, and current operation storage 82 for providing the next randomized operation for execution in a data processing system. Multi-level data structure 84 is partitioned into a plurality of rows labeled "ROW 0"-"ROW 3", where each row has a plurality of sub-parts. The illustrated example has 16 total sub-parts distributed between the four rows. The sub-parts may be a plurality of data blocks such as states, operations, data bytes, etc. A method for operating shuffling mechanism 60 is provided. First, a row is selected and an index (PREVIOUS INDEX) of the row is provided to the shuffling mechanism 62. The order of the rows is determined using shuffling mechanism 62. Within each row, the order of the sub-parts of the row is ordered using shuffling mechanism 72. Shuffling mechanisms 62 and 72 operate as described above for FIG. 2 and FIG. 3, where the function used by increment functions 70 and 80 can be any function. Also, a new increment function or a new parameter, or both, can be chosen for each row to generate more different permutations. The illustrated example of data structure 84 has four rows and four data blocks per row having indexes 0-15. In this example, $2^{15}$ (32,768) different permutations can be generated. As an example, assume the increment functions for increment functions 70 and 80 are both addition. If, for example, the starting row is ROW 1 and the increment PARAMETER is also +1, then the rows would be ordered 1, 2, 3, 0. While handling each row, a new starting position inside a row is generated. The increment parameter may be different than +1, or the same. In the example, the starting values for each row is 2 for ROW 0, 4 for ROW 1, 9 for ROW 3, and 13 for ROW 3. The parameters for each row are ROW 0=1, ROW 1=1, ROW 2=3, and ROW 3=1. This will provide the execution order of indexes 4, 5, 6, 7, 9, 8, 11, 10, 13, 14, 15, 12, 2, 3, 0, and 1. In another embodiment, the increment functions and parameters may be different for each row. Shuffling mechanism 60 is particularly useful when the number of data blocks is not relatively close to a prime number, that is, where the number of data blocks to be shuffled, plus one, is not a prime, as shown in the example of FIG. 3. For example, if the number of data blocks in the multi-level data structure 84 equals 32, 32 plus 1 equals 33, which is not prime. The number 31 is prime, but cannot be used because it is smaller than 32. The use of a modulo of a prime number is useful for ensuring no data is repeated when the increment function includes a multiplication. The use of modulo of a prime number may not be as helpful when the increment function is, for example, an addition. However, by partitioning the data blocks in shuffling mechanism 60 as illustrated, both shuffling mechanisms 62 and 72 may use mod 17 for the number of iterations to completely order all the data blocks without using an additional mechanism to prevent repeating a data block.

Figure 5:
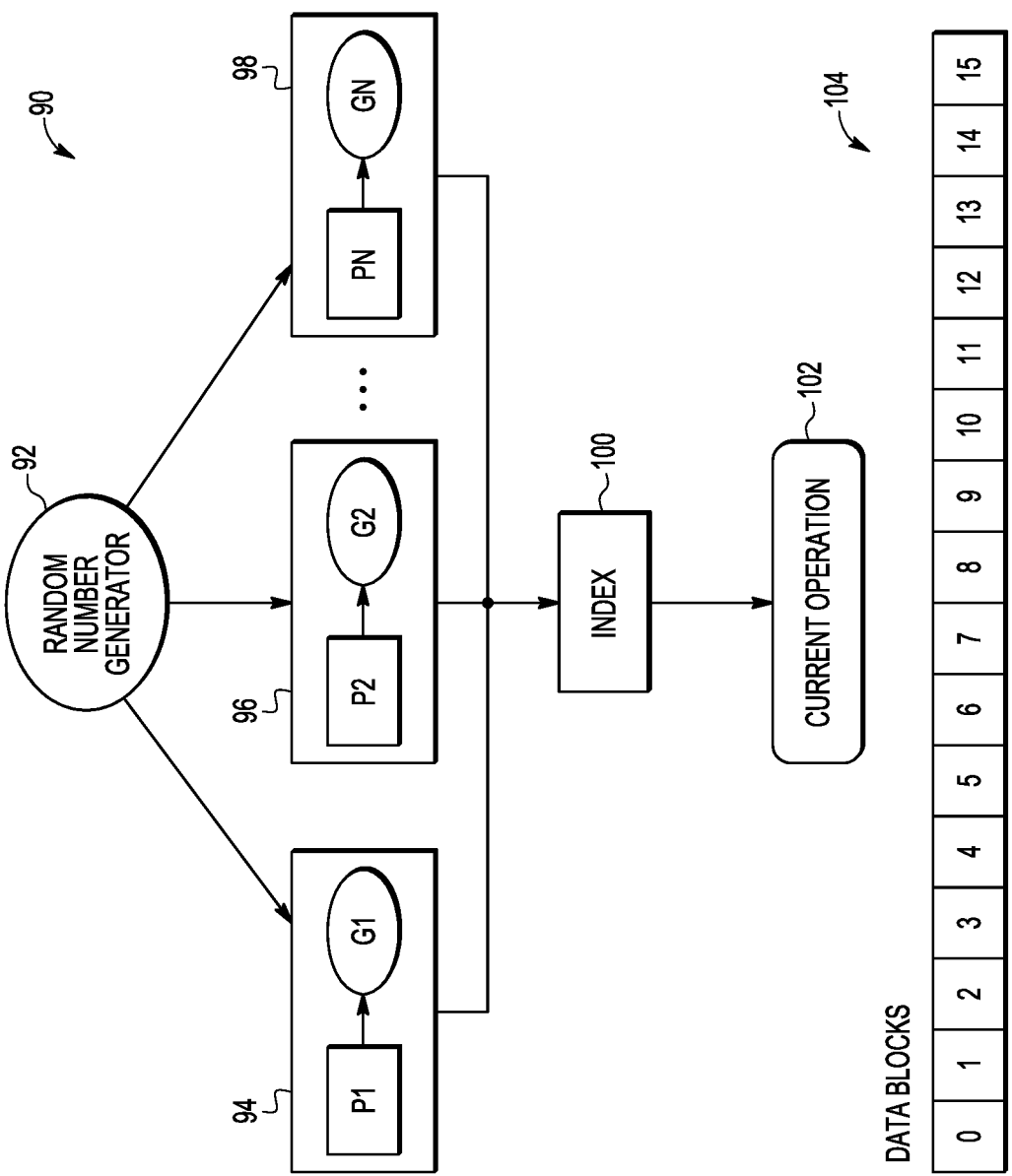

FIG. 5 illustrates a shuffling mechanism 90 in accordance with another embodiment. Shuffling mechanism 90 includes RNG 92, and a plurality of shuffling mechanisms represented by shuffling mechanisms 94, 96, and 98, index storage 100, and current operation storage 102. Each shuffling mechanism functions as described for the shuffling mechanisms illustrated in FIG. 2, FIG. 3, or FIG. 4. Shuffling mechanisms 94, 96, and 98 are coupled to receive a random number from RNG 92. Also, each of shuffling mechanisms 94, 96, and 98 are coupled to provide an index to index storage 100, the index corresponding to a current operation. Each of shuffling mechanisms 94, 96, and 98 implement a different increment function and may have a different parameter. For example, as illustrated in FIG. 5, shuffling mechanism 94 includes increment function g1 and parameter p1, shuffling mechanism 96 includes parameter p2 and increment function g2, and shuffling mechanism 98 includes parameter pN and increment function gN, where N is an integer for the number of shuffling mechanisms with different increment functions. A method of using shuffling mechanism 90 may begin by choosing which of increment functions g1, g2, and gN to use. Increment functions g1, g2, and gN may be one of either addition, multiplication, exponential, etc. After choosing the increment function and parameter, the method proceeds as described above regarding FIG. 2, FIG. 3, or FIG. 4.

As an example, suppose shuffling mechanism 90 has two shuffling mechanisms such as shuffling mechanisms 94 and 96. Also, shuffling mechanism 94 is implemented as shuffling mechanism 24 in FIG. 2 and shuffling mechanism 96 is implemented as shuffling mechanism 40 in FIG. 3. In general, the number of different permutations that can be generated is equal to the sum of permutations of the each of the individual shuffling mechanisms, assuming all the generated permutations are non-overlapping. By using shuffling mechanism 90, 256 different order permutations can be generated. Including more shuffling mechanisms with different increment functions will increase the number of different permutations that can be generated.

Figure 6:
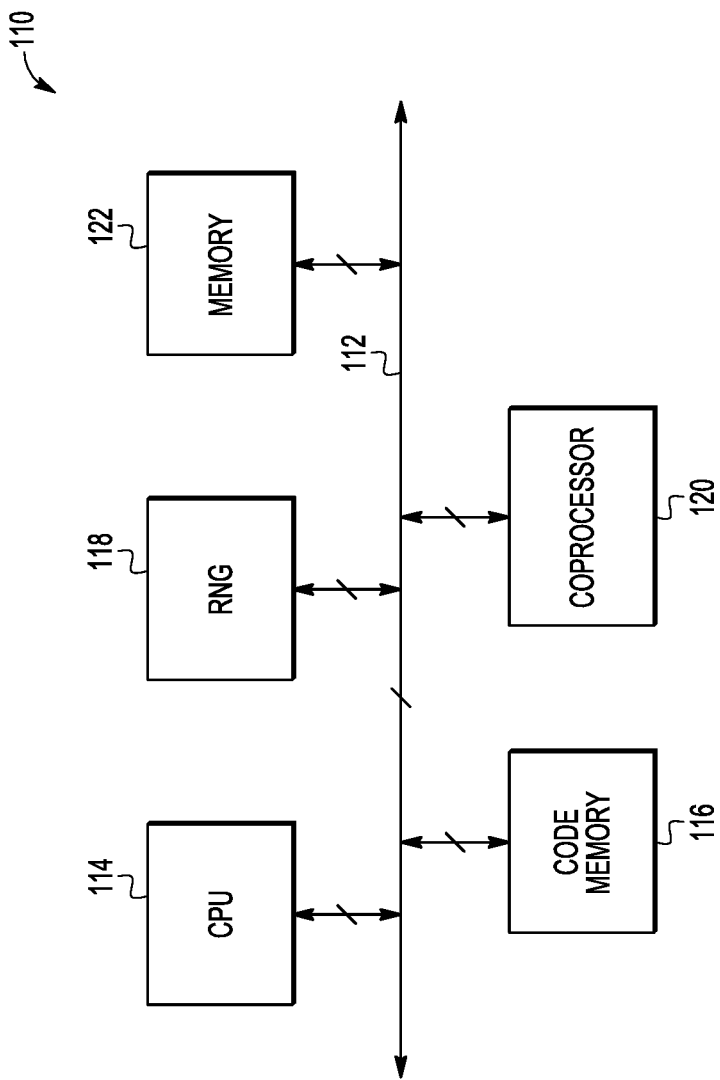
FIG. 6 illustrates a data processing system in accordance with an embodiment.

FIG. 6 illustrates a data processing system 110 in accordance with an embodiment. Data processing system 110 includes a system bus 112, central processing unit (CPU) 114, memory 116, RNG 118, coprocessor 120, and memory 112. System bus 112 may be any type of system bus for communicating data and instructions. Central processing unit 114 is bi-directionally connected to bus 112 and may be one or more of any type of processor, or processor core, such as a microprocessor (MPU), microcontroller (MCU), digital system processor (DSP), etc. Memory 116 is bi-directionally connected to bus 112 and may be any suitable type of volatile or non-volatile memory for storing instructions in, for example, an instruction queue for CPU 114. Random number generator 118 is bi-directionally connected to bus 112, and may be one or more of any type of RNG or pseudo RNG for generating the random numbers used in the disclosed embodiments. In one embodiment, CPU 114 may be used to control the method for shuffling and the operations of the random number generator and increment function blocks. Coprocessor 120 is bi-directionally connected to bus 112 and may be any type of data processor or processor core. For example, coprocessor 120 may be include one or more MPU, MCU, DSP, etc. One or both of CPU 114 and coprocessor 120 may be used for implementing an encryption or decryption algorithm. Also, CPU 114 or coprocessor 1120 may be characterized as being a secure processor or include a secure element for securely storing of processing information. Memory 122 is bi-directionally connected to bus 112 and may be any type of volatile or non-volatile memory for storing data and/or instructions. Memories 116 and 122 may be implemented as portions of the same memory array. The described embodiments may be implemented in data processing system 110 as hardware, software, or a combination of hardware and software. The hardware may be implemented as electrical or electronic circuits.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for shuffling an order of a plurality of operations in a data processing system, each operation assigned a unique index, the plurality of operations having a first execution order based on an ordering of the unique indexes, the method comprising:

provided a parameter for use with an increment function, wherein the parameter is an integer greater than one, and the increment function is one of a multiplication function or an exponential function;

randomly selecting one of the unique indexes of the first execution order to be a first index, wherein the first index and an operation associated with the first index is to be a first operation in a second execution order of the plurality of operations;

applying the increment function with the parameter to the first index to generate a second index, the second index and associated operation to be a second operation of the plurality of operations to be executed in the second execution order;

applying the increment function with the parameter to the second index to generate a third index, the third index and associated operation to be a third operation of the plurality of operations to be executed in the second execution order;

repeating the step of applying the increment function with the parameter to each subsequent index until all of the plurality of operations have been reordered in the second execution order; and executing the plurality of operations in the data processing system according to the second execution order as a countermeasure against a side-channel attack against the data processing system.

2. The method of claim 1, wherein the increment function uses a modulo of a prime number greater than the plurality of operations to be shuffled.

3. The method of claim 2, further comprising an additional increment function following the increment function that uses the modulo of the prime number, the additional increment function configured to renumber the indexes of the reordered plurality of operations without changing an order of the reordered plurality of operations.

4. The method of claim 1, wherein the unique indexes of the plurality of operations in the first execution order are in a sequence from a lowest index to highest index.

5. The method of claim 1, wherein the first index is a starting index for each row of a plurality of rows, and wherein the steps of the method are repeated to determine an execution order of the operations for each row of the plurality of rows.

6. The method of claim 1, wherein the plurality of operations is organized as a plurality of rows of operations, wherein the steps of the method are used to select a row of the plurality of rows, and wherein the steps of the method are used for each of the plurality of rows.

7. The method of claim 6, wherein in the step of providing a parameter for use with the increment function for each row of the plurality of rows, providing a different parameter for use in the steps of the method for each row.

8. A method for shuffling an execution order of a plurality of operations to be executed in a data processing system, the method comprising:

randomly selecting a parameter, the parameter being an integer greater than one for use with an increment function, wherein the increment function is one or either a multiplication function or an exponential function;

randomly selecting a first index, wherein each operation of the plurality of operations has an index that uniquely identifies each operation of the plurality of operations, the first index and associated operation being a first operation to be executed in a new execution order of the plurality of operations;

applying the increment function with the parameter to the first index to generate a second index, the second index and associated operation to be a second operation of the plurality of operations to be executed in the new execution order;

repeating the step of applying the increment function with the parameter to each of the unique indexes until the reordering of the plurality of operations in the new execution order is complete; and executing the plurality of operations in the data processing system according to the reordering, wherein the reordering provides a countermeasure against a side-channel attack against the data processing system.

9. The method of claim 8, wherein the increment function uses a modulo of a prime number greater than a total number of the plurality of operations to be shuffled.

10. The method of claim 8, wherein the first index is a starting index for each row of a plurality of rows, and wherein the steps of the method are repeated to determine an execution order of the operations for each row of the plurality of rows.

11. The method of claim 10, wherein the steps of the method are repeated to determine the execution order of operations for each row of the plurality of rows using a different increment function for each row.

12. The method of claim 8, wherein each operation of the plurality of operations is implemented in one or more instructions to be executed in the data processing system, and wherein the index of each operation is associated with the one or more instructions for executing the operation.

13. The method of claim 8, further comprising randomly selecting the increment function.

14. The method of claim 8, wherein the increment function uses a modulo of a prime number greater than the plurality of operations to be shuffled.

15. The method of claim 14, further comprising an additional increment function following the increment function that uses the modulo of the prime number, the additional increment function configured to renumber the indexes of the new execution order of plurality of operations.

16. A data processing system comprising a processor and a shuffling mechanism, the shuffling mechanism configured to reorder a first execution order of a plurality of operations to a second execution order of the plurality of operations, each operation of the plurality of operations having an index, the shuffling mechanism comprising:

a random number generator for generating a random number for use selecting a first index, the first index and an associated operation being the first operation to be executed in the second execution order of the plurality of operations;

an increment function block for receiving a parameter and the first index, wherein the parameter is an integer greater than one and the increment function is one of either a multiplication function or an exponential function, and in response, generating a second index by applying an increment function with the parameter to the first index, the second index and associated operation of the plurality of operations being a second operation to be executed in the second execution order, wherein the increment function and the parameter are applied to all indexes of the plurality of operations until all of the plurality of operations are reordered in the second execution order;

a storage element for storing the plurality of operations in the second execution order, wherein the processor executes the plurality of operations according to the second execution order to provide a countermeasure against a side-channel attack against the data processing system.

17. The shuffling mechanism of claim 16, wherein the increment function uses a modulo of a prime number greater than a total number of the plurality of operations to be shuffled.

18. The shuffling mechanism of claim 17, further comprising an additional increment function following the increment function that uses the modulo of the prime number, the additional increment function configured to renumber the indexes of the second execution order without changing the second execution order.

19. The shuffling mechanism of claim 16, wherein the increment function is selected randomly to be either the multiplication function or the exponential function.

* * * * *